MILLS & WALDO.
Smut Mill.

No. 100,054. Patented Feb. 22, 1870.

WITNESSES
W. L. Selleck
W. M. Harmor

INVENTOR
Ian Mills
Albert G. Waldo
By their atty.
J. B. Smith

United States Patent Office.

JONATHAN MILLS AND ALBERT G. WALDO, OF MILWAUKEE, WISCONSIN.

Letters Patent No. 100,054, dated February 22, 1870.

IMPROVEMENT IN SMUT-MILLS AND SEPARATORS.

The Schedule referred to in these Letters Patent and making part of the same

*To all whom it may concern:*

Be it known that we, JONATHAN MILLS and ALBERT G. WALDO, of the city and county of Milwaukee, and State of Wisconsin, have invented a new and useful Improvement in Smut-Mills and Separators; and we do hereby declare that the following is a full, clear, and exact description thereof, which will enable those skilled in the art to make and use the same, reference being had to the accompanying drawing forming part of this specification, in which—

Figure 1:
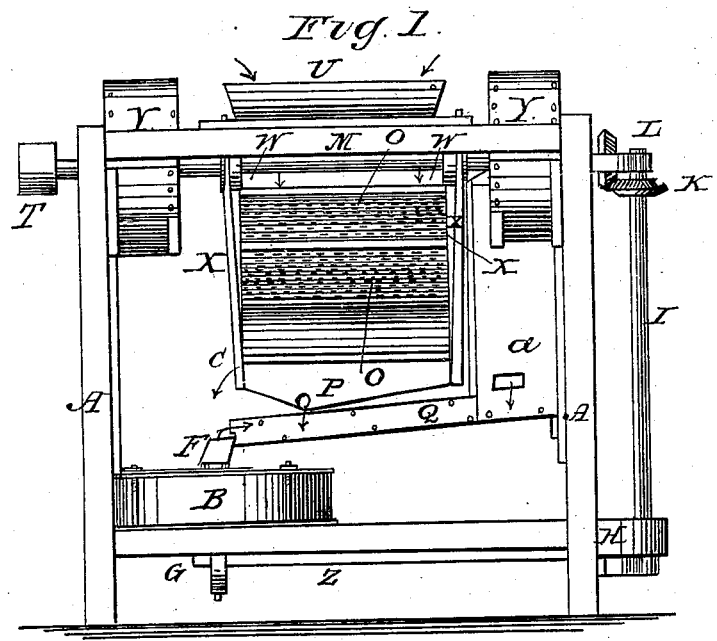

Figure 1 is a perspective view of our invention, and

Figure 2:
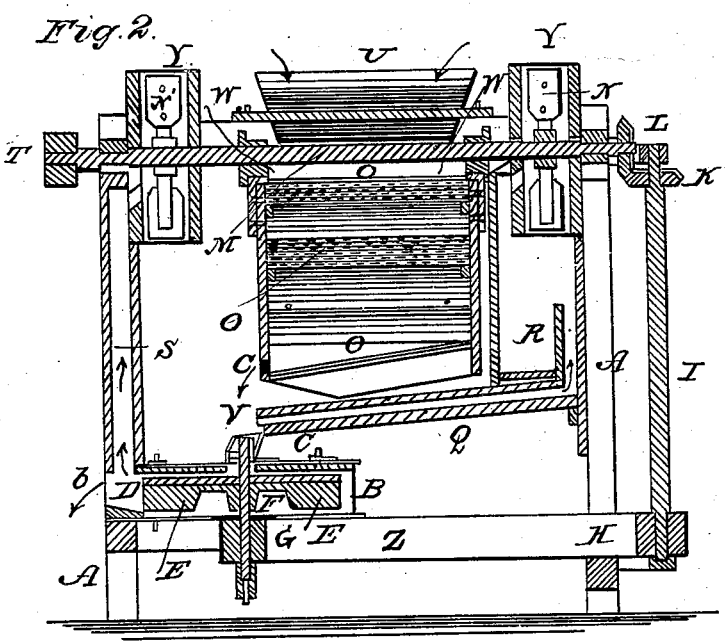

Figure 2, a longitudinal sectional view.

Similar letters of reference, in each of the figures, indicate corresponding parts.

The nature of our invention is to produce a combined smut-machine and separator which will thoroughly clean grain ready for grinding.

A, the frame-work.
B, the box in which are the grain-scourers.
C, the upper scourer, fastened permanently.
D, the lower scourer, which revolves. These scourers are made of burr-stone, vulcanite, emery, or any other suitable material.
E, a fan fastened to the same shaft with the lower scourer, and revolves with it.
F, scourer-shaft.
G, pulley on shaft F.
H, pulley on shaft I.
I, upright shaft.
K, bevel cog-wheel on upright shaft I.
L, cog-wheel meshing into wheel K.
M, main driving-shaft.
N N', fans on shaft M.
O, sieves.
P, hole for cockle to come out.
Q, air-conveyer.
R, division in air-conveyer Q.
S, air-conveyer.
T, pulley on main shaft.
U, hopper for the grain.
V, opening for the grain to pass to the scourers.
W, eccentrics which shake the sieves.
X, hanging hooks which hold the sieves.
Y, covers to the fans N N'.
Z, belt which drives the scourer D.

*a*, opening for the cockle and small seeds to fall out of conveyer Q.
*b*, outlet for the grain after it is scoured.
*c*, outlet for the grain from the sieves to the scourers.

Operation.

Let the grain fall into hopper U, from which it will fall onto sieves O, and, as the main shaft revolves, eccentrics W shake the sieves, and the grain falls through the sieves O, the chaff and oats falling over the sides; and, when the grain falls on the lower sieve O, the cockle and small seeds go through that sieve, and fall out of hole P. The grain falls out of hole *c* into the opening V, and thus to the scourers. Whatever chaff, dust, or cockle goes out with the grain is sucked up through spout Q by means of fan N, the dust passing out through a hole in the spout up by the fan, and the cockle falling down over the division R in the spout Q, and out through spout *a*, and, as the scourer D revolves, the grain is scoured, and the fan E blows the grain and dust out through opening *b*. The dust is drawn up through spout S by the draught caused by fan N'. The main shaft M, put in motion by a belt over pulley T, and bevel-wheel L meshing into wheel K, revolves shaft I and pulley H, and belt Z revolves the scourer E.

We do not claim as new the several devices above described, nor any general combination of the same; but

What we claim, and desire to secure by Letters Patent of the United States, is—

The improved arrangement of parts in the smut-mill and separator herein shown, consisting of the box B, smooth burr or emery scourers C and D, fans E, and shaft F, with air-conveyer Q, partition R, sieves O, operated by eccentrics W W on shaft M, with fans N N' and air-conveyer S, when said parts are constructed, arranged, and operated as shown and for the purpose set forth.

JNO. MILLS.
A. G. WALDO.

Witnesses:
J. B. SMITH,
J. C. POLLARD.